(12) United States Patent
Severn

(10) Patent No.: US 6,188,118 B1
(45) Date of Patent: Feb. 13, 2001

(54) SEMICONDUCTOR PHOTODETECTOR PACKAGING

(75) Inventor: John Kenneth Severn, Devon (GB)

(73) Assignee: Nortel Networks Limited, Montreal (CA)

(*) Notice: Under 35 U.S.C. 154(b), the term of this patent shall be extended for 0 days.

(21) Appl. No.: 09/214,634

(22) PCT Filed: Aug. 1, 1997

(86) PCT No.: PCT/GB97/02053

§ 371 Date: Jan. 6, 1999

§ 102(e) Date: Jan. 6, 1999

(87) PCT Pub. No.: WO98/06141

PCT Pub. Date: Feb. 12, 1998

(30) Foreign Application Priority Data

Aug. 6, 1996 (GB) .................................. 9616545

(51) Int. Cl.[7] .............................. H01L 31/0232
(52) U.S. Cl. .................. 257/432; 257/433; 257/434; 257/458; 257/461; 257/680; 438/64; 438/65; 438/66
(58) Field of Search .................... 257/680, 433, 257/434, 458, 461, 432; 438/64, 65, 66

(56) References Cited

FOREIGN PATENT DOCUMENTS

| 0264122 A2 | 10/1986 | (EP) . |
|---|---|---|
| 0604405A1 | 4/1991 | (EP) . |
| 0547807A2 | 6/1993 | (EP) . |
| 0633607 A1 | 6/1994 | (EP) . |
| 2 064862 | 11/1980 | (GB) . |

OTHER PUBLICATIONS

IEE Photonics Technology Letters 3(1991) Dec., No. 12, New York Y Kito et al High–Speed Flip–Chip InP/InGaAs Avalanche Photodiodes with Ultralow Capacitance and Large Gain–Bandwidth Products.

*Primary Examiner*—William Mintel
(74) *Attorney, Agent, or Firm*—Lee, Mann, Smith, McWilliams, Sweeney & Ohlson

(57) ABSTRACT

A rear light entry photodetector chip is secured face-down with solder on to the front face of a ceramic submount provided with a pair of electrically conductive vias. A frame-shaped mass of solder seals the chip to the submount to provide a hermetic enclosure protecting sensitive semiconductor surface areas of the photodetector chip where electric fields are liable to be present in the vicinity of a pn or metal/semiconductor junction.

4 Claims, 5 Drawing Sheets

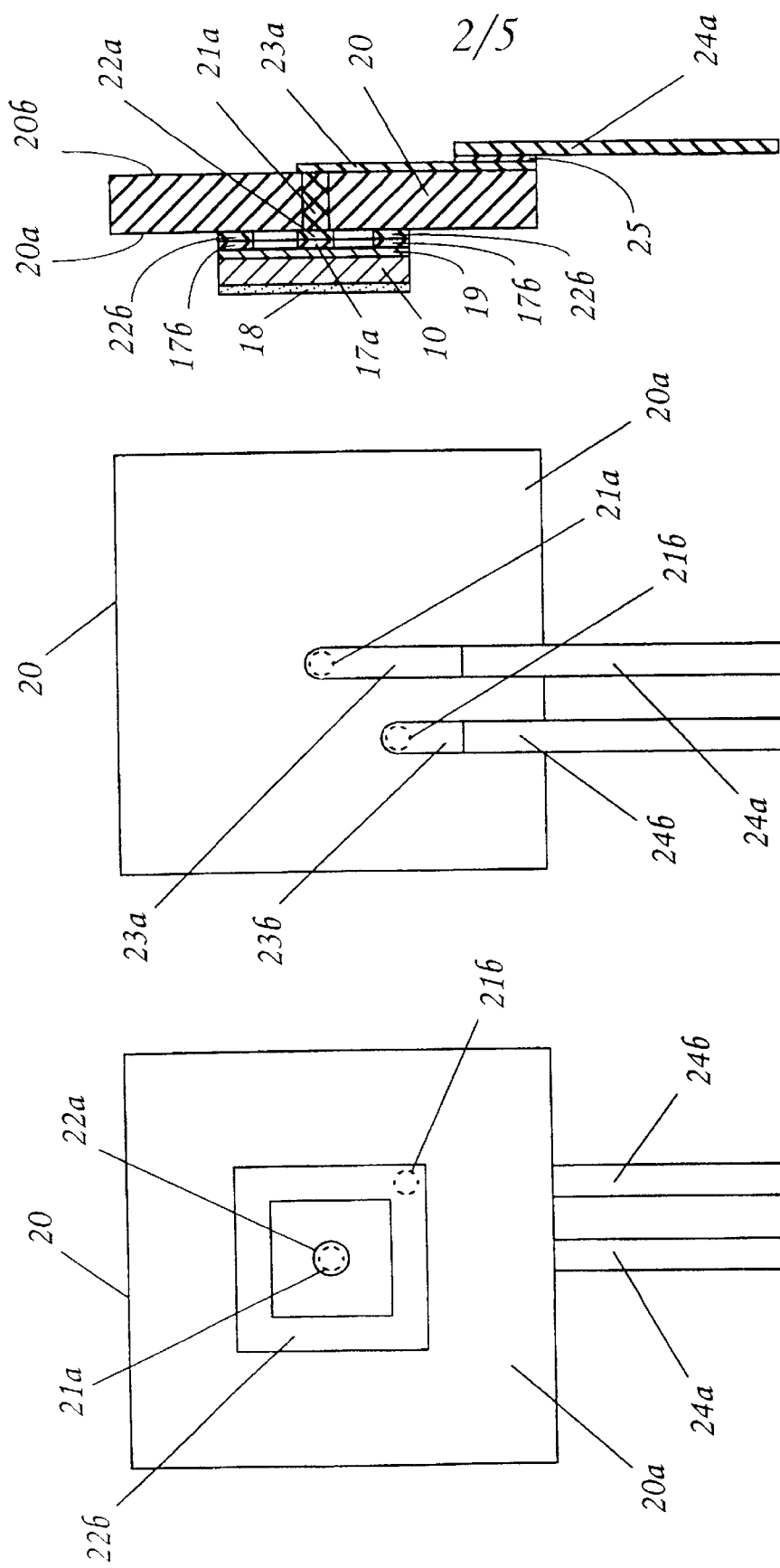

SEMICONDUCTOR PHOTODETECTOR PACKAGING

BACKGROUND OF THE INVENTION

It is known that, if exposed to an undesirable environment, the performance of a semiconductor photodetector can become degraded even though sensitive surface areas of the photodetector, particularly where an electric field is present during operation of the photodetector in the vicinity of a p-n junction or a junction between semiconductor material and metal, are protected from the ambient by a deposited dielectric layer. For this reason a number of applications for photodetectors have required such photodetectors to be hermetically packaged in order to reduce the risk of occurrence of this kind of performance degradation. The packaging must include provision, both for electrical connections with the photodetector from outside the package, and for the feeding into the package of the optical signal that the photodetector is designed to detect. One way of effecting such provision is to provide a window in the package wall, as for instance described in GB 2 208 944A. If the photodetector is to receive light emitted from the end of an optical fiber, the construction of the package may be such as to make the minimum separation between the end of the fiber and the photodetector so great as to require some form of lens coupling between them. This may be provided by a lens within the package, by a lens outside the package, or by using a lens as part of the package window, as described in GB 2 208 944A. As an alternative to the use of a window, a wall of the package may be penetrated in a hermetically sealed manner by some form of light guide, as for instance described in GB 2 064 862A. In the case of the particular structure described in GB 2 064 862A, the outer end of the light guide is butted against the optical fiber, but a clearly valid alternative is to replace the light guide with an optical fiber having properties similar to, or identical with, those of the optical fiber whose output it is desired shall be detected by the photodetector.

The use of the optical fiber/guide hermetic feedthrough, by definition requires an hermetic seal around the optical fiber/guide, and this is typically expensive to manufacture and difficult to test for leaks because the fiber is usually provided outside the enclosure with mechanical protection in the form of a plastics protective coating. The use of a window in place of the hermetic fiber-guide feedthrough avoids these particular problems, albeit at the expense of adding significantly to the complexity and expense of the provision of a mechanical link between the photodetector chip and the optical fiber whose output is to be detected by the chip.

SUMMARY OF THE INVENTION

The present invention is concerned with an alternative form of hermetic enclosure which does not involve any requirement for an optical fiber/guide hermetic feedthrough, and which affords the possibility of a relatively simple and cheap form of establishing mechanical coupling of the end of an optical fiber so as direct light emitted therefrom on to the photosensitive area of the photodetector.

According to the present invention there is provided a photodetector assembly including a rear light entry planar construction of semiconductor photodetector chip bonded face down upon a ceramic substrate so as to constitute a hermetic enclosure with opposed walls constituted respectively by the chip and the ceramic substrate.

BRIEF DESCRIPTION OF THE DRAWINGS

There follows a description of photodetector assemblies embodying the present invention in preferred form. The description refers to the accompanying drawings in which FIG.

FIGS. 2 and 3 are schematic front and rear views of the photodetector submount, FIG. 4 is a schematic cross-section of the photodetector and submount sub-assembly.

DETAILED DESCRIPTION OF PREFERRED EMBODIMENTS

Figure 1:
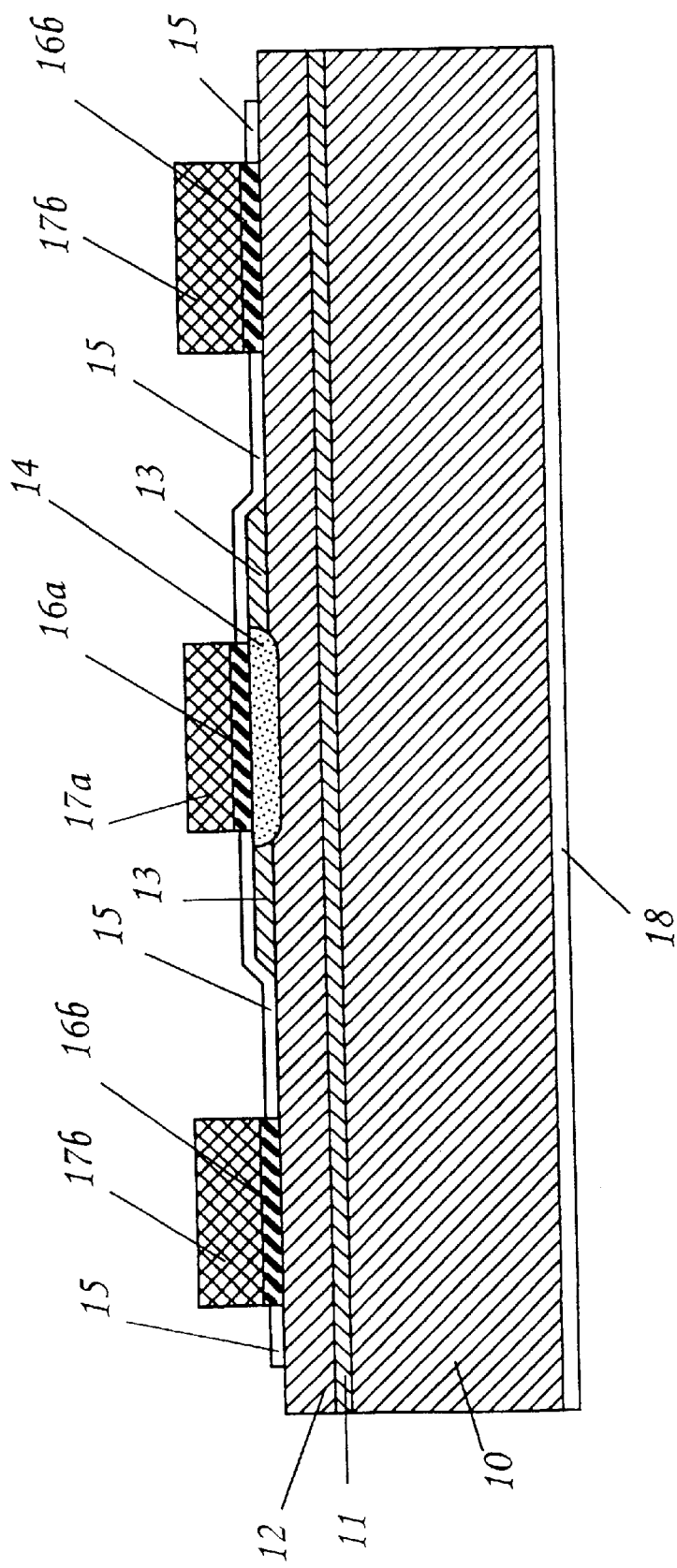
FIG. 1 is a schematic cross-section of the photodetector area of the photodetector.

The basic structure of the rear light-entry planar semiconductor photodiode chip depicted in FIG. 1 is created on a tin-doped InP substrate 10. On the substrate are epitaxially grown an n-type InP buffer layer 11, an intrinsic InGaAs absorption layer 12, and an n-type InP layer of capping material 13. The capping layer is masked, and a portion 14 of it, and of the underlying absorption layer 12, is converted into p-type material by the diffusion of zinc from a source (not shown) of ZnAs. Except for a small region of the remaining n-type capping material that surrounds the p-type region of portion 14, the rest of the capping layer material is removed. A layer 15 of silicon oxynitride is deposited to augment silicon oxynitride regions left by previous processing, and this (composite) layer 15 is patterned to define contact areas prior to the sputtering of platinum/gold contact metal which is patterned to define a central contact 16a contacting the p-type material and, encircling contact 16a, a rectangular frame-shaped outer contact 16b contacting the n-type material of the absorption layer 12. The inner and outer contacts 16a and 16b are coated respectively with preforms 17a and 17b of 80:20 gold:tin solder conforming in shape with their underlying contacts 16a and 16b. This solder is conveniently deposited using an e-beam evaporator and lift-off photolithography. Optionally, the rear face of the substrate 10 is provided with an antireflection coating 18.

The front and rear faces of a ceramic submount for the photodiode of FIG. 1 are depicted respectively in FIGS. 2 and 3, while a section through the submount, with the photodiode already mounted, is depicted in FIG. 4. For convenience of illustration, the photodiode chip is represented in section in FIG. 4, and in succeeding Figures; by three layers topped with the solder preforms 17a and 17b, the three layers comprising the photodiode substrate 10, the optional anti-reflection coating 18 on the rear face of the substrate 10, and a composite layer 19 that incorporates the whole structure of the completed photodiode of FIG. 1 that is formed on the front face of its substrate 10.

The submount, which is indicated generally at 20, is a ceramic submount of a type which has electrically conductive metallic-filled vias 21a and 21b extending through the thickness of the submount from the front surface 20a to the rear 20b. Such vias are created by filling through-holes in the submount, while it is still green (un-fired), with a metal loaded paste of a refractory metal such as tungsten, and then firing the submount. Ceramic submounts of this type are known for example from EP 0 547 807, and can for instance be purchased from Sumitomo Metal Ceramics Inc. or NTK, Technical Ceramics Division of NGK Spark Plug Company Ltd The fully fired submount is provided, on its front face 20a, with areas 22a and 22b of metallisation. These areas of metallisation cover the respective vias 21a and 21b, and have configurations corresponding to those of the p-type and n-type contacts 16 and 17 of the photodiode respectively. The rear face 20b of the submount 20 is provided with two areas 23a and 23b of metallisation respectively contacting vias 21a and 21b, to which areas terminal tags 24a and 24b are secured with braze metal 25.

The photodiode chip is applied to the submount with a tack bond which is effected at a temperature at which the solder is hot enough to be tacky rather than fully molten. The assembly is placed in a chamber (not shown) in order to remove any moisture from the space, contained between the photodiode chip and submount, that is encircled by the frame-shaped solder preform 17b. To this end, this space may be first evacuated, and then back-filled with an inert gas such as dry nitrogen or argon. The flushing of moisture from the space may be facilitated by arranging for there to be a vent provided by a break (not shown) in the frame of the solder preform 17b. After the residual moisture has been flushed from the space, the solder is heated to a higher temperature sufficient to cause it to become fully molten, at which stage the vent is closed by capillary flow. In this way a hermetically sealed enclosure is formed containing the regions of the photodiodes particularly sensitive to degradation, namely the surface area of semiconductive material where an electric field may be present during operation of the photodetector in the vicinity of its p-n junction or a semiconductor/metal junction.

In the foregoing specific description the frame-shaped solder preform 17b performs (after it has been flowed) the dual function of seal for the hermetic enclosure, and of providing electrical connection between the n-type contact of the photodiode chip and metallisation on the submount. In an alternative configuration, not shown, these functions are separated so that the frame-shaped solder preform that performs the sealing function (after it has been flowed) encircles both the electrical connection with the p-type contact, and that made with the n-type contact. In either instance the frame-shaped solder preform that performs the sealing function is not necessarily rectangular, but may for instance be circular. Another variant involves applying the solder preforms to the submount rather than to the photodiode chip. Such solder can, in this instance, conveniently be applied by screen printing.

Figure 5:
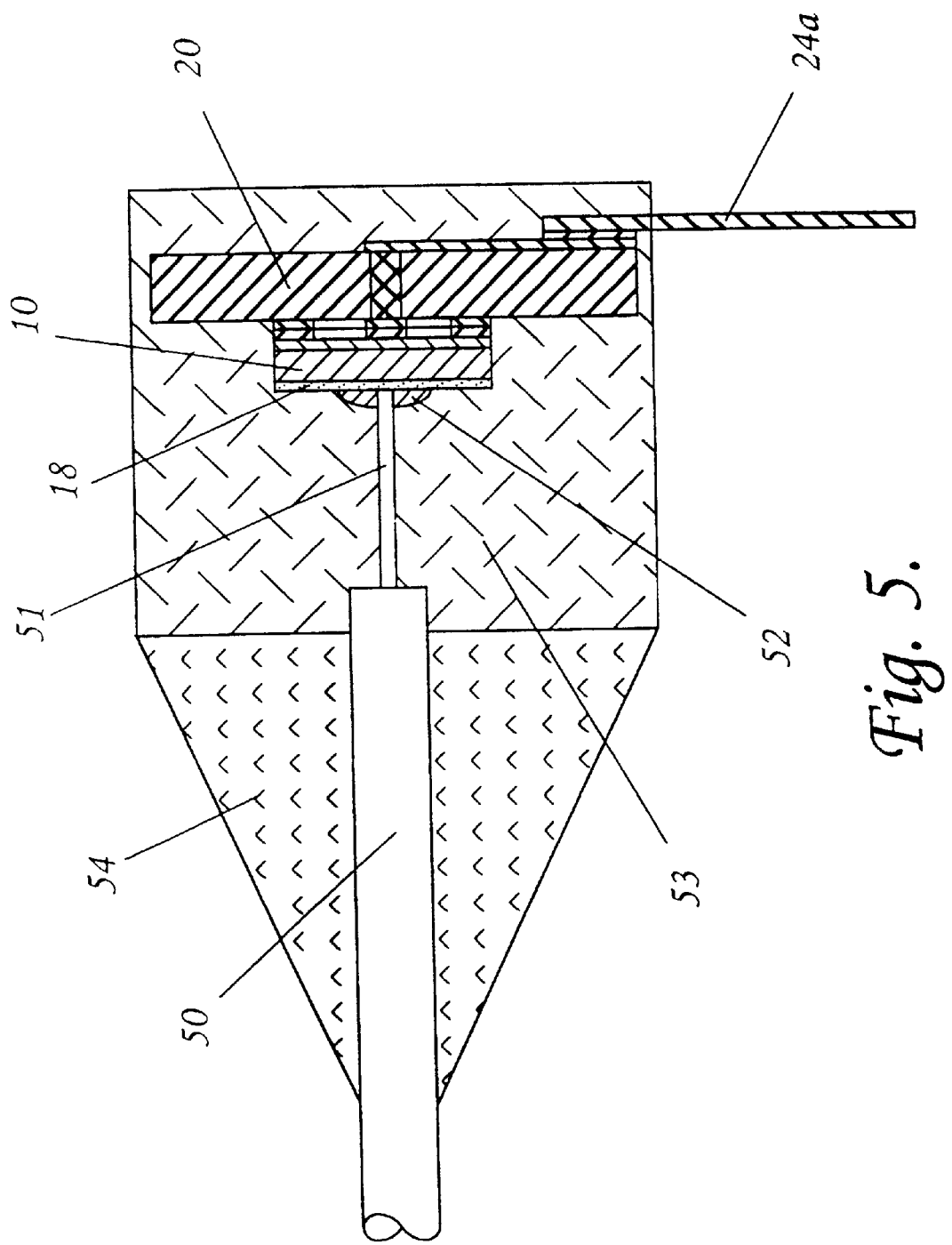
FIGS. 5 and 6 are fiber-pigtailed and connectorised versions respectively of assemblies incorporating the sub-assembly of FIG. 4.
Figure 6:
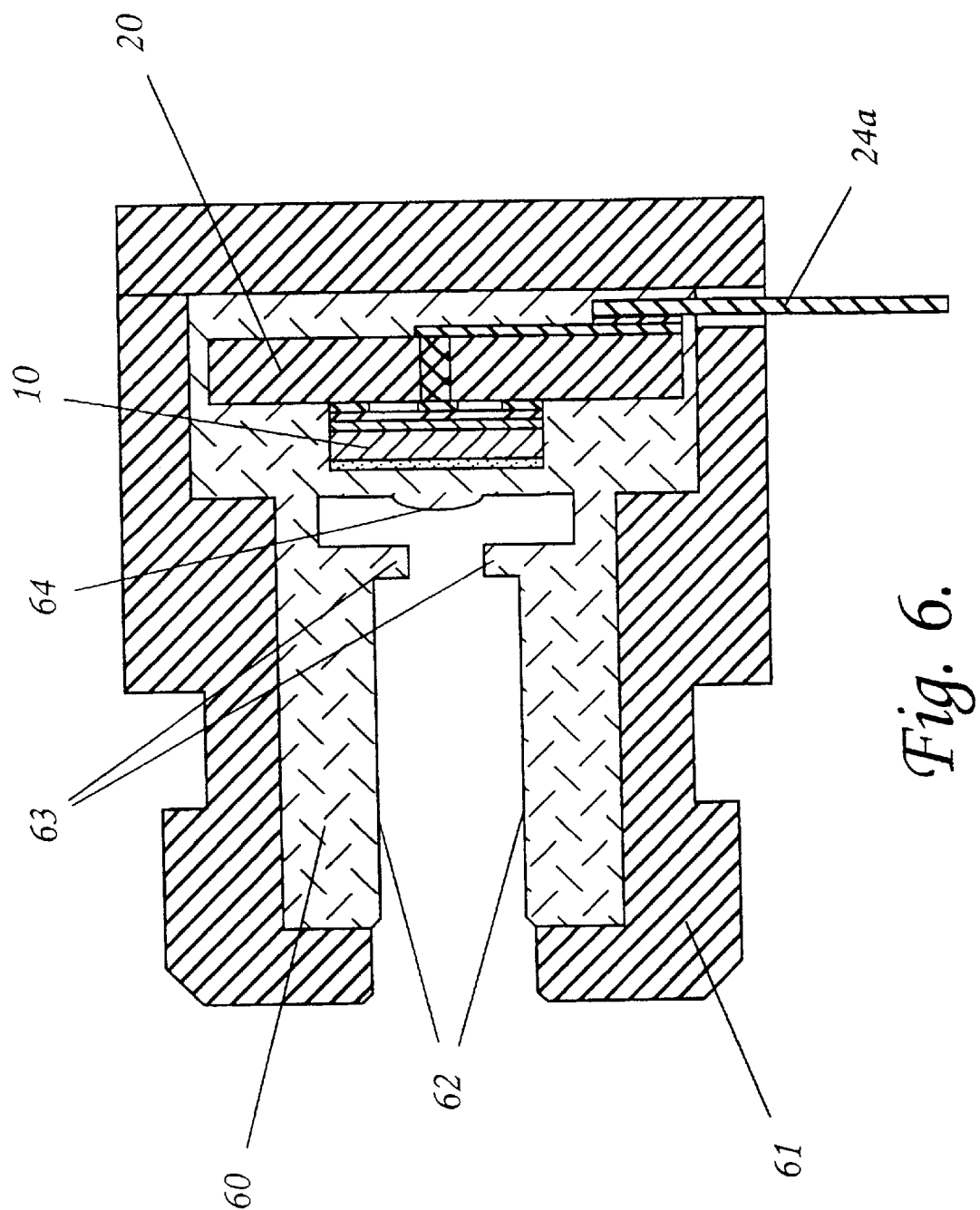

The sub-assembly of FIG. 4, or variant thereof, may be incorporated into a fiber pigtailed assembly as depicted in FIG. 5 or a connectorised assembly as depicted in FIG. 6.

In the case of the fiber pigtailed assembly of FIG. 5, a length of plastics protective coated optical fiber 50 has its plastic protective coating stripped for a short distance back from one end to expose bare fiber 51. The end of this bare fiber is secured in position in abutment with the rear face of the photodiode chip (in abutment with its antireflection coating 18 if such coating is provided) by means of a fillet 52 of adhesive, for instance epoxy. The sub-assembly is then potted in a mass 53 of plastics encapsulant, and then a further mass 54 of plastics material is applied around the fiber 50, where it emerges from the mass 53, in order to limit in-service bending strain in this region.

In the case of the connectorised assembly of FIG. 6, the sub-assembly is potted in a mass 60 of clear plastics encapsulant, and this is contained within a connector shell 61 which is typically also made of plastics, but may alternatively be a metal connector shell. The clear plastics encapsulant is formed with a bore 62, for receiving a ferrule terminated fiber (not shown). The depth of insertion of such a ferrule is limited by an internal flange 63 and co-axial, with the bore 62 is formed a lens 64 for focusing light emitted from the ferrule terminated fiber upon the photosensitive area of the photodetector.

Figure 7:
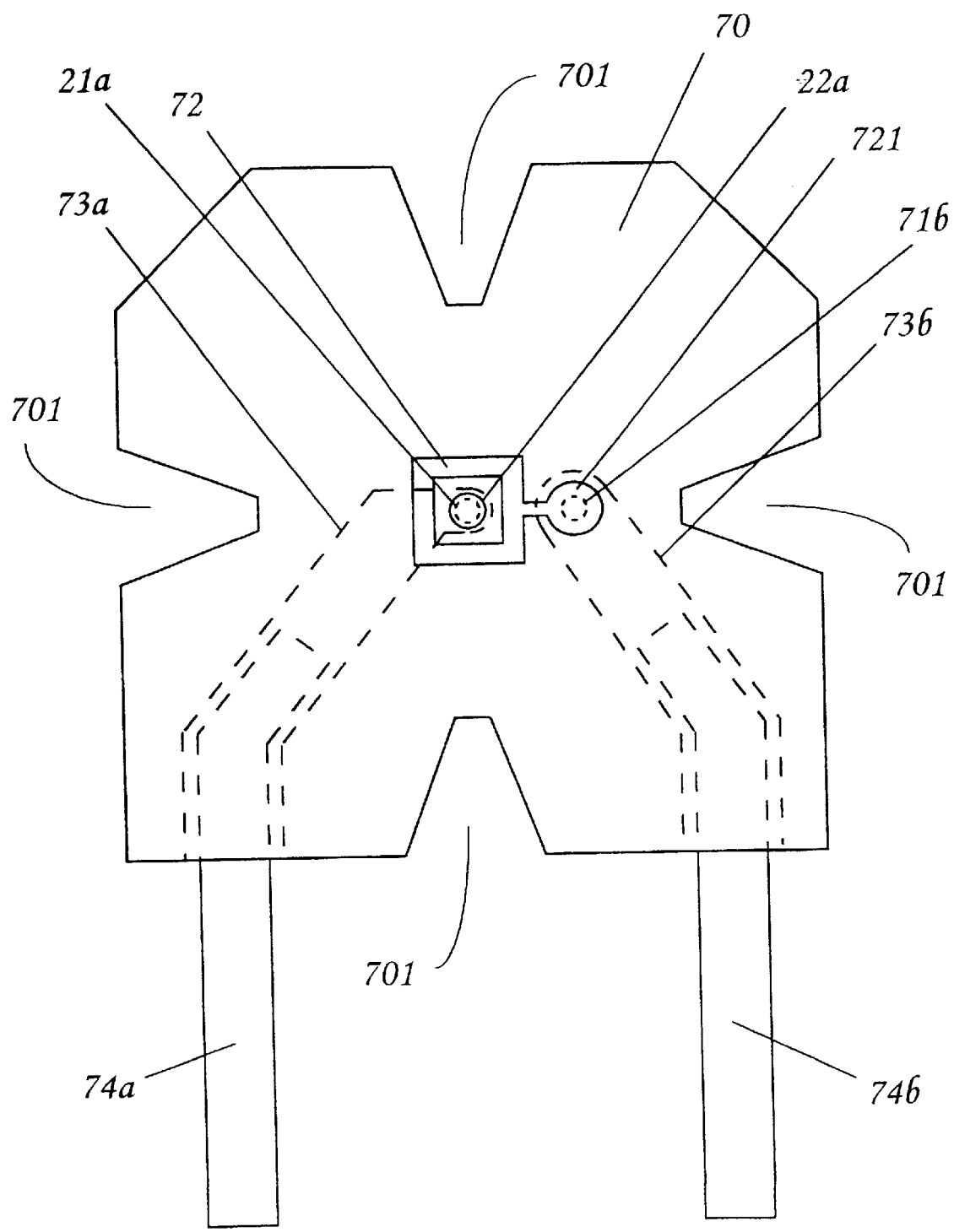
FIG. 7 is a schematic front view of an alternative form of photodetector submount.

FIG. 7 depicts an alternative form of submount for a photodiode which is distinguished from that of FIGS. 2 and 3 primarily in that its ceramic 70 is provided, while still in its green state, with a set of V-slots 701 for mechanical registration purposes when the submount is later to be encapsulated. In the connectorised assembly such mechanical registration avoids the necessity for more time-consuming registration techniques such as active optical alignment or visual alignment. The layout of the metallisations on both faces of the ceramic have also been changed, together with the shape of the terminal taps and the location of the via providing electrical connection with the n-type contact of the photodetector chip (not shown in this Figure). Thus in this instance the via 71b that provides electrical connection with the n-type contact lies outside the frame-shaped area of metallisation on the front surface of the submount contacting the frame-shaped solder preform of the photodiode chip. Accordingly metallisation 72 includes, in addition to its frame portion, a short half-dumbbell 721 extending to cover via 71b. In this way any departure in planarity in the immediate vicinity of via 71 does not affect the quality of the seal provided by the frame-shaped solder preform of the photodiode chip. The configuration of the areas of metallisation 73a and 73b, and those of the two terminal tags 74a and 74b, are also changed in a manner that provides a greater separation between the terminal tags that meets an industrial standard.

What is claimed is:

1. A photodetector assembly including a rear light entry planar construction of semiconductor photodetector chip bonded face down upon a ceramic substrate so as to constitute a hermetic enclosure with opposed walls constituted respectively by the chip and the ceramic substrate.

2. A photodetector assembly as claimed in claim 1, wherein the bonding of the chip to the ceramic substrate that forms the hermetic enclosure is bonding with solder, and wherein electrical contact with the photodetector is made by way of electrically conductive connections at least one of which includes an electrically conductive via extending through the ceramic substrate from a front surface thereof to a rear surface thereof.

3. A photodetector assembly as claimed in claim 2, wherein the planar construction of semiconductor photodetector is a photodiode provided with n-type and p-type contacts, one of which encircles the other, and wherein the encircling contact is bonded with solder to the ceramic substrate in such a way that this bond co-operates with the chip and the ceramic substrate to form the hermetic enclosure.

4. A photodetector assembly as claimed in claim 2 wherein the planar construction of semiconductor photodetector is a photodiode provided with n-type and p-type contacts both encircled by a frame-shaped region of solder wettable material which is bonded with solder to the ceramic substrate in such a way that this bond co-operates with its chip and the ceramic substrate to form the hermetic enclosure.

* * * * *